United States Patent [19]
Cunningham

[11] Patent Number: 5,945,947
[45] Date of Patent: Aug. 31, 1999

[54] SYNTHETIC DOPPLER DIRECTION FINDER FOR USE WITH FSK ENCODED TRANSMITTERS

[75] Inventor: David C. Cunningham, Carefree, Ariz.

[73] Assignee: Doppler Systems, Inc., Phoenix, Ariz.

[21] Appl. No.: 09/104,748

[22] Filed: Jun. 25, 1998

[51] Int. Cl.[6] .................................................. G01S 5/04
[52] U.S. Cl. ..................... 342/442; 342/56; 342/398; 342/417; 342/445
[58] Field of Search ............................. 342/56, 398, 417, 342/424, 428, 442, 429, 449

[56] References Cited

U.S. PATENT DOCUMENTS

| | | |
|---|---|---|
| 3,386,097 | 5/1968 | Richter et al. . |
| 3,701,155 | 10/1972 | Adams ................................ 343/117 R |
| 3,813,672 | 5/1974 | Weisser ................................ 343/113 R |
| 4,041,486 | 8/1977 | Hussain . |
| 4,041,496 | 8/1977 | Norris . |
| 4,121,216 | 10/1978 | Bunch et al. ........................ 343/113 R |
| 4,148,034 | 4/1979 | Cooney . |
| 4,177,466 | 12/1979 | Reagan . |
| 4,292,639 | 9/1981 | Bambara . |
| 4,358,768 | 11/1982 | Ernst et al. . |
| 4,551,727 | 11/1985 | Cunningham . |
| 4,818,998 | 4/1989 | Apsell et al. . |
| 4,833,478 | 5/1989 | Nossen ................................... 342/435 |
| 4,908,629 | 3/1990 | Apsell et al. . |
| 5,003,317 | 3/1991 | Gray et al. . |
| 5,448,248 | 9/1995 | Anttila ................................... 342/400 |
| 5,515,062 | 5/1996 | Maine et al. . |

Primary Examiner—Thomas H. Tarcza
Assistant Examiner—Dao L. Phan
Attorney, Agent, or Firm—Harry M. Weiss; Harry M. Weiss & Associates, P.C.

[57] ABSTRACT

A radio direction finder based on the simulated Doppler frequency shift principle is disclosed that is applicable to FSK encoded pulsed transmissions. Typical applications include tracking of stolen vehicles or shipped package tracking. During FSK decoding, all antenna elements of the antenna array are turned on in a non-rotating mode thus eliminating error due to the simulated antenna rotation modulation while providing enhanced gain for the FSK decoder circuit. After decoding a suitable FSK signal, a virtual antenna rotation is enabled, and the bearing is measured during the time interval when the transmitter is only broadcasting a carrier wave.

21 Claims, 4 Drawing Sheets

SYNTHETIC DOPPLER DIRECTION FINDER FOR USE WITH FSK ENCODED TRANSMITTERS

RELATED APPLICATION

This patent application is related to U.S. Pat. No. 4,551,727 entitled "Radio Direction Finder System" in the name of the same inventor, and is incorporated herein by reference.

BACKGROUND OF THE INVENTION

1. Field of the Invention

This invention is in the field of radio direction finding systems and methods therefor, and more particularly is an improved radio direction finding system utilizing Doppler frequency shift principles whereby frequency modulation is imparted to the received signal by electronically moving the effective receiving antenna location along a circular path such that the modulation phase angle indicates the bearing of the radio transmission.

2. Description of the Related Art

Radio direction finders (RDFs) are used to indicate the angle of arrival of an incoming radio frequency wave front for the purpose of locating the source of the transmission. A single RDF may be used on a mobile platform to home in on the source of the transmission, or a network of RDFs may be used to locate the transmission source by triangulation.

An excellent type of RDF is that utilizing the synthetic Doppler method. In this system, a circular array of fixed antenna elements is switched sequentially or combined electronically so as to simulate the rotation of a single antenna element in a circle. See for example, U.S. Pat. No. 4,551,727 "Radio Direction Finding System" by David C. Cunningham. As the simulated antenna approaches the direction of the incoming wave front, the apparent frequency increases due to the well known Doppler Effect. Similarly, when the simulated antenna moves in the same direction as the wave front, its apparent frequency decreases. This up-down frequency modulation is recovered by connecting the RDF antenna to a standard frequency modulation receiver and can be heard as a tone at the audio output of the receiver. The frequency of the tone is the same as the rotational rate of the antenna, and the phase of the tone is related to the direction of arrival. The RDF provides the signal processing to measure this phase and display the bearing to the transmission source.

One of the many applications in which RDFs are utilized is to locate vehicles (police cars, delivery vans or stolen cars). In the case of stolen vehicle location, the transmitter is generally activated by the police using radio control after the vehicle is reported missing. See for example U.S. Pat. No. 4,818,998 by Apsell and Stapelfeld. Additional applications include the tracking of shipped packages by freight carriers or others where it is desired to verify the location of the shipped package.

In such applications, it is necessary to distinguish which of many vehicles is transmitting the signal that is being tracked. This is most commonly accomplished by utilizing a pulsed transmission which is frequency modulated by a digitally coded sequence to indicate the identity of the vehicle. A variety of frequency shift keying techniques (FSK, MSK, GMSK, CPFSK, etc.) are used to carry the digitally encoded identification number of the transmitter on the pulsed signal. See for example, the MX-COM Products and Applications book which discusses these techniques and presents integrated circuits that are used to encode and decode FSK signals (Available annually directly from MX-COM Inc. of Winston-Salem N.C.)

There are several compatibility problems that arise when a synthetic Doppler RDF is used with an FSK coded pulse transmission. The frequency modulation of the encoded signal interferes with the recovery of the phase information in the RDF due to the overlapping of the FSK modulation with the frequency modulation of the simulated antenna rotation. Furthermore, the frequency modulation due to the antenna rotation interferes with the recovery of the FSK coded signal information. These problems can be alleviated to some extent by judicious selection of the frequency modulation frequencies (FSK tones) and the rotational speed of the RDF antenna. However, this approach is limited by the audio bandpass of the receiver, the modulation sidebands of both the FSK modulation and the RDF antenna modulation, and non-linearities in the receiver.

Another problem is that the signal level required to provide acceptable FSK demodulation is typically several dB higher than that needed to produce a stable bearing display. This can result in the RDF displaying bearings toward transmitters other than the one desired. Such extraneous signals can be due to other transmission sources, intermodulation or harmonics of broadcast signals, and interference.

Therefore, a need existed to provide a radio direction finder utilizing the Doppler principle that is not subject to the bearing errors caused by the FSK modulation. Additionally, a need existed to provide FSK decoding of the transmitted identification data in a Doppler direction finder that is not subject to the errors caused by the simulated rotation of the antenna.

SUMMARY OF THE INVENTION

An object of the present invention is to provide a radio direction finder utilizing the Doppler principle that is not subject to the bearing errors caused by the FSK modulation.

Another object of the present invention is to provide FSK decoding of the transmitted identification data in a Doppler direction finder that is not subject to the errors caused by the simulated rotation of the antenna.

BRIEF DESCRIPTION OF THE PREFERRED EMBODIMENTS

In accordance with one embodiment of the present invention, an improved radio direction finder is disclosed. The improved radio direction finder is comprised of an antenna means for receiving a locator transmission signal having alternating periods of a broadcast RF carrier wave and a broadcast modulated RF carrier wave, a radio direction finder (RDF) means coupled to the antenna means for determining the direction to a broadcasting transmitter and for extracting coded information from the locator transmission signal wherein the RDF means comprises antenna virtual rotation control means coupled to the antenna means for controlling the antenna in both a non-rotational mode for detection of the broadcast modulated RF carrier wave and a virtual rotation mode for detection of the broadcast RF carrier wave. Additionally, the antenna means comprises a plurality of antenna elements of at least 3. The RDF means further comprises receiving circuitry means coupled to the antenna means for receiving the locator transmission signal, and decoding circuitry means coupled to the antenna means for decoding the coded information. The RDF means further comprises microprocessor means coupled to the antenna means for calculating a bearing angle to the broadcasting means and antenna virtual rotation control means for selecting from among the non-rotational mode for detection of the broadcast modulated RF carrier wave and the virtual rotation mode for detection of the broadcast RF carrier wave. The system further comprises summing means coupled to the plurality of antenna elements for continuous switching of the antenna elements and for mixing of the locator transmission signal received by the antenna elements.

In accordance with another embodiment of the present invention, a method for receiving and decoding a locator transmission signal is disclosed. The method comprises the steps of providing an antenna for receiving the locator transmission signal wherein the locator transmission signal comprises a period of a broadcast RF carrier wave and a period of a broadcast modulated RF carrier wave, holding the antenna stationary for enhanced extraction of embedded information from the broadcast modulated RF carrier wave, and virtually rotating the antenna during the period of the broadcast RF carrier wave for determining the bearing angle to the source of the broadcast RF carrier wave. The step of providing an antenna further comprises the step of providing an antenna having at least 3 antenna elements. The method further comprises the steps of summing a signal from each of the at least three antenna elements during the period of non-rotation of the antenna to provide a summed signal from which to extract the embedded information, and continuously switching and mixing a signal from each of the at least 3 antenna elements to virtually rotate the antenna wherein the virtual rotation of the antenna is used for determining the bearing angle to the source of the broadcast RF carrier wave.

The foregoing and other objects, features, and advantages of the invention will be apparent from the following, more particular, description of the preferred embodiments of the invention, as illustrated in the accompanying drawings.

DESCRIPTION OF THE PREFERRED EMBODIMENTS

An improved system and method for receiving and decoding an FSK encoded locator transmission signal is described below. The system is directed towards a radio direction finder utilizing the Doppler principle that is not subject to the bearing measurement errors caused by FSK modulation nor the FSK decoding errors caused by the rotation, simulated or actual, of the antenna. The improvement is achieved by using a system that makes use of the fact that a locator transmission signal comprises a period of a broadcast RF carrier wave, and a period of a broadcast modulated RF carrier wave. The present invention is directed towards holding the antenna stationary for enhanced extraction of embedded information from the broadcast modulated RF carrier wave, and then virtually rotating the antenna during the period of the broadcast RF carrier wave for determining the bearing angle to the source of the broadcast RF carrier wave.

Figure 1:
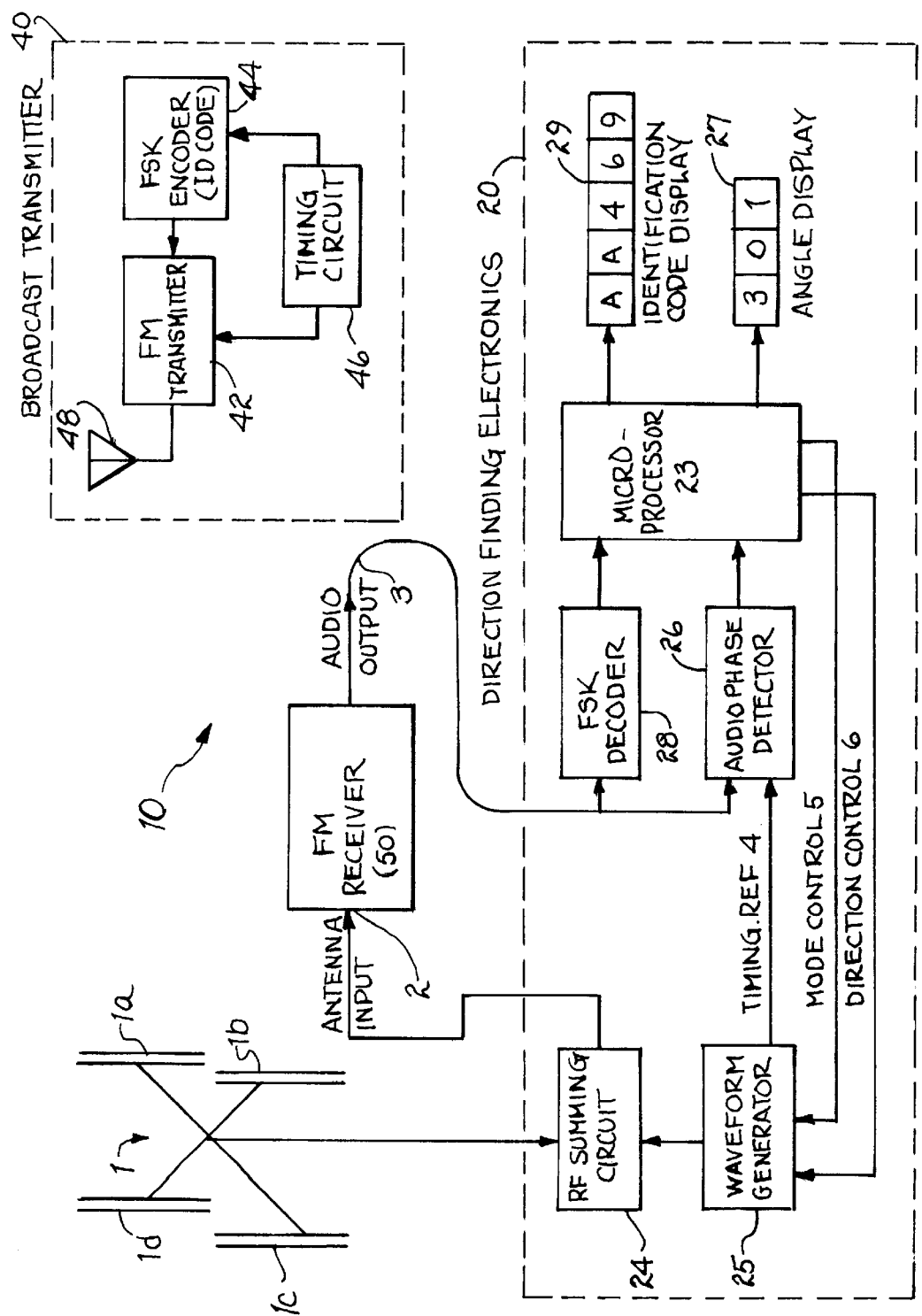
FIG. 1 is a simplified block diagram of the radio direction finding/identification transmitter & receiver systems.

Referring to FIG. 1, the radio direction finding system is shown (hereinafter the "system 10"). The system 10, consists of a multiple element antenna 1 (hereinafter the "antenna 1"), a direction finding electronics 20, and an FM receiver 50. The direction finding electronics 20 comprise an RF summing circuit 24, a waveform generator 25, an audio phase detector 26, an angle display 27, an FSK decoder 28, an identification code display 29 and a microprocessor 23. The FM receiver 50 is a separate self contained unit utilized with the present invention.

Figure 2:
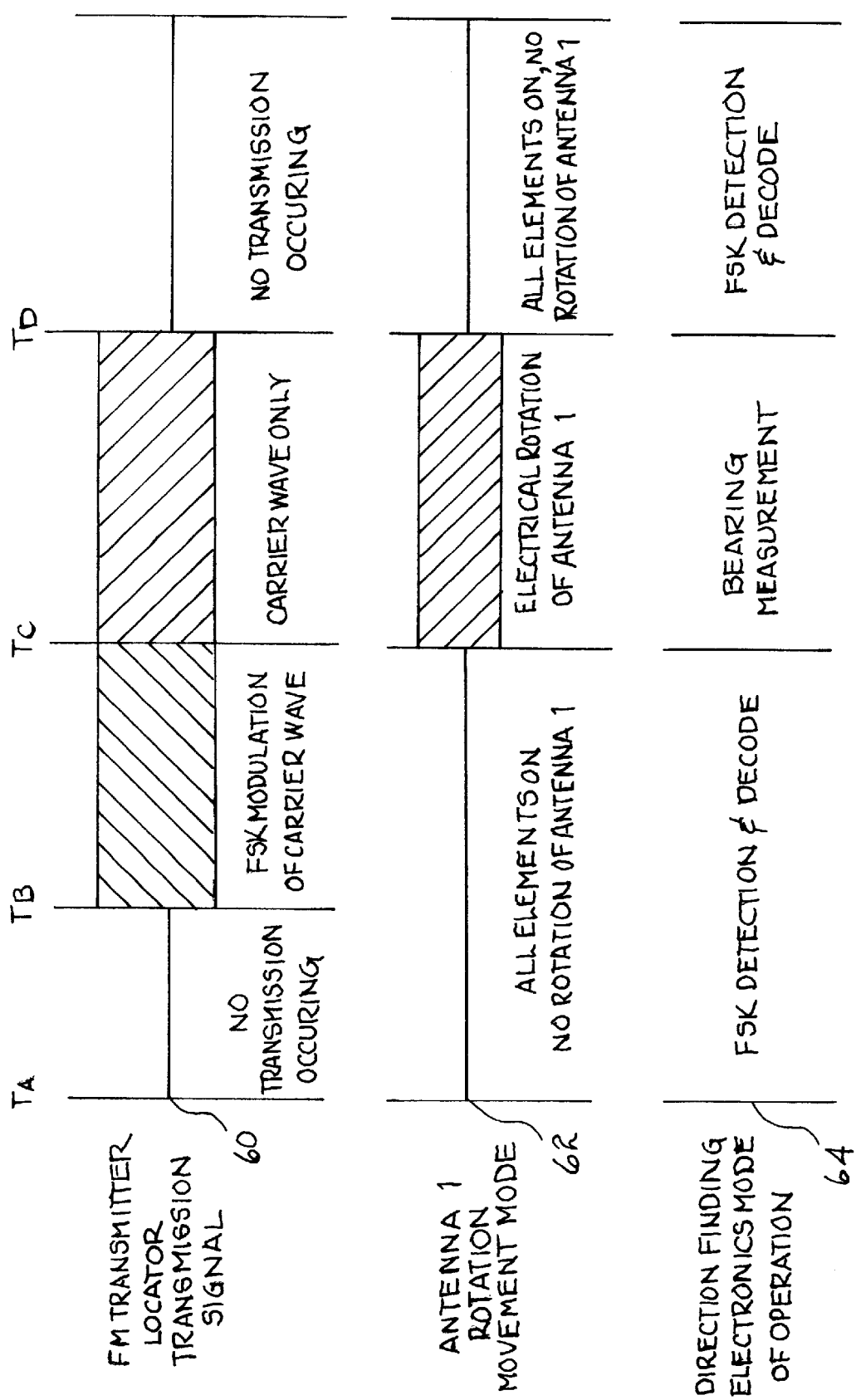
FIG. 2 shows the timing intervals and identifies the associated modes of operation of the radio direction finding/identification decoding system.

A broadcast transmitter outputting an appropriate locator transmission signal, while not part of the present invention, is described herein to aid in understanding the construction and operation of the present invention. A typical broadcast transmitter 40 consists of a broadcast antenna 48, an FM transmitter 42, an FSK encoder 44, and a timer 46. The broadcast transmitter 40 outputs a locator transmission signal as shown in FIG. 2 line 60. The broadcast transmitter 40 comprises an antenna 48 coupled to an FM transmitter 42. The FM transmitter 42 is coupled to the FSK encoder 44 which supplies an identification code or other desired information. Coupled to both the FM transmitter 42 and the FSK encoder 44 is the timer 46. The timer 46 controls the on and off operation of the FM transmitter 42, and also controls the timing of the FSK encoder 44's output of the identification code. The identification code controls the modulation of the carrier wave broadcast by the FM transmitter 42.

The system 10 receives the broadcast locator transmission signal via the multiple element antenna 1 which consists of the antenna elements 1a, b, c, d. The antenna elements 1a, b, c, d are arranged in a pattern so as to form a regular polygon. The minimum number of elements may actually be as few as three elements in a triangular pattern, but 4 or 8 are typically used depending on the accuracy requirements of the system. Each antenna element 1a–d is designed to provide omnidirectional reception and the spacing between adjacent antenna elements 1a–d is less than ½ a wavelength. In a preferred embodiment, of the present invention the spacing between adjacent antenna elements 1a–d is in the range of ⅛ to ⅜ wavelength.

Coupled to the antenna 1 is the RF summing circuit 24. The RF summing circuit 24 combines the broadcast location transmission signals received by each of the antenna elements 1a–d so as to generate a single broadcast location transmission signal (see FIG. 2 line 62.) having a maximum possible gain. This results in the maximum possible sensitivity of the system 10 and results in the generated or combined single broadcast location transmission signal approximating the gain of the signal which would be induced into a larger single antenna element. This addition of the signals from each antenna element 1a–d takes place when the antenna 1 is not rotating. The RF summing circuit 24 also contains the circuitry (not shown) to control the gains from each individual antenna element 1a–d, and will cause the simulated antenna rotation when the gains are varied in the correct sequence. The RF summing circuit 24 also sums the signal outputs of the antenna elements 1a–d. A preferred method for implementing the RF summing circuit 24 is to use (not shown herein) a circuit possessing constant input impedance, variable gain preamplifiers and a resistive or inductive summing network as described by the inventor's previous U.S. Pat. No. 4,551,727. Alternative methods that may be used for RF summing circuits and, which are well known to those skilled in the art, include the series PIN diodes described in Norris U.S. Pat. No. 4,041, 496 or the odd/even channel clement switches with two variable gain circuits described in Bambara U.S. Pat. No. 4,292,639.

The RF summing circuit 24 is coupled to the waveform generator 25. The waveform generator 25 provides the control voltages used to vary the gains in the RF summing circuit 24. Typically, one waveform is used for each antenna element 1a–d, and the waveforms are identical except they are displaced in time. For example, in a preferred embodiment, a four antenna element 1a–d system requires that each control waveform be phased 90 degrees apart. By simulating a rotating antenna using varying gains for the antenna elements 1a–d the incoming location transmission signals are frequency modulated due to the Doppler Effect. The modulation frequency is equal to the rotational speed of the simulated antenna, the deviation is proportional to the antenna spacing, and the phase of the modulation, relative to the reference signal used to control the RF summing circuit 24, is equal to the bearing angle. The waveform generator 25 also supplies timing reference 4 signals to the audio phase detector 26.

The RF summing circuit 24 is coupled to an FM receiver 50. The FM receiver 50 selects the specific signal frequency desired and demodulates the frequency modulation induced by the simulated rotating antenna 1. The FM receiver 50 in a preferred embodiment is an external, stand-alone, FM receiver of the scanner or two-way transceiver variety, and must be supplied by the user of the present invention. Alternatively, although not shown herein, an FM receiver could be incorporated into the present invention. The system 10 couples to the FM receiver 50 in a standard manner as is well known to those skilled in the art. The RF summing circuit 24 couples to the antenna input 2 of the FM receiver 50, and the FM receiver 50 audio output 3 couples to the FSK decoder 28 and the audio phase detector 26 via standard connections or jacks. The FM receiver 50, previously coupled to the direction finding electronics 20, is used to select the specific signal frequency desired and to demodulate the frequency modulation induced by the simulated rotating antenna. If the broadcast transmission locator signal also contains frequency modulation, both the transmitted modulation and the antenna sweep frequency will be present at the audio output 3 of the FM receiver 50.

Figure 4:
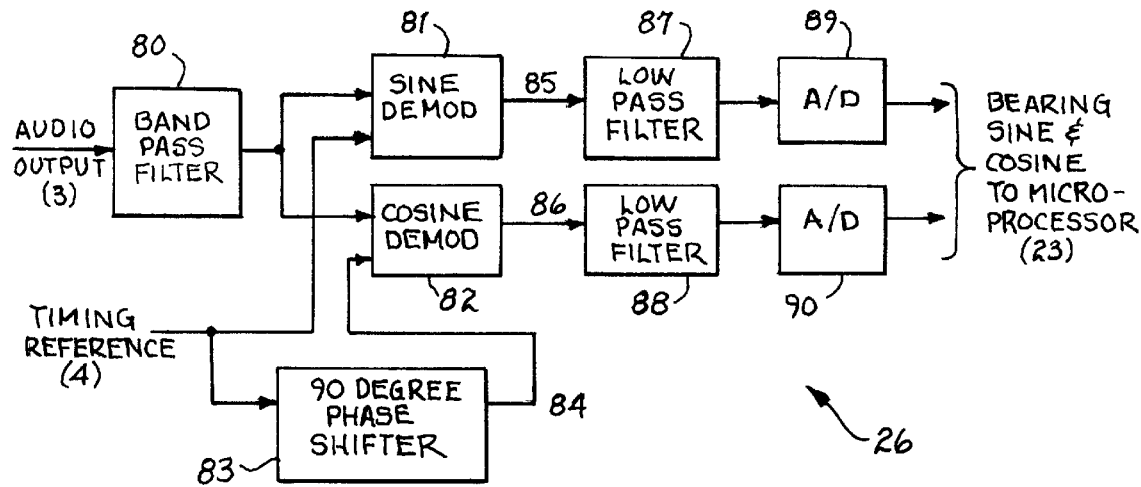
FIG. 4 is a simplified block diagram of the synchronous demodulator implementation of the audio phase detector and shows a timing sequence of its use.
Figure 4:
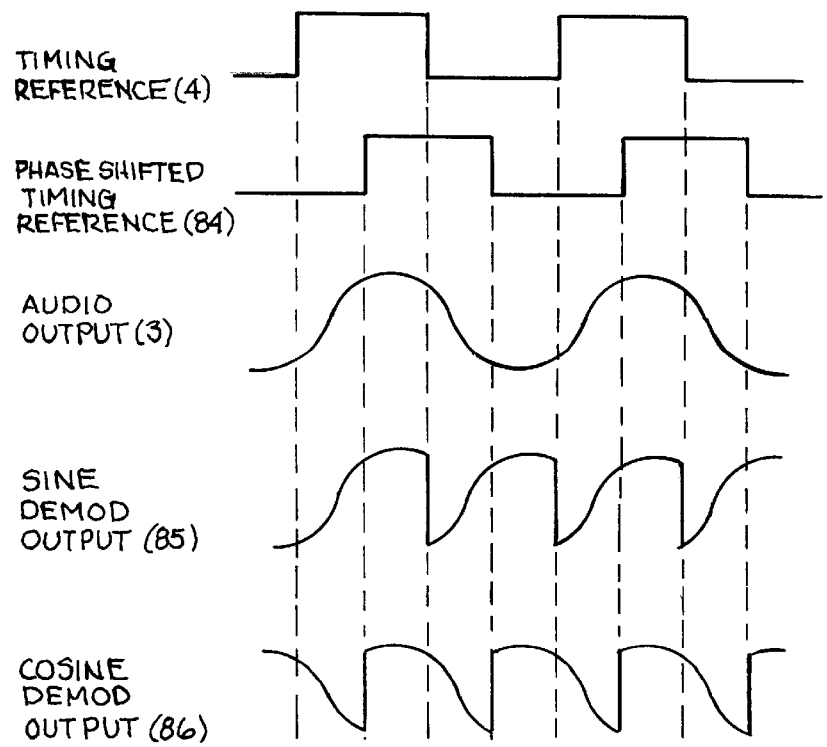

Referring to FIG. 4, one embodiment of the audio phase detector 26 is shown. This embodiment implements a synchronous demodulator for the audio phase detector 26. The bandpass filter 80 is set to pass the audio component at the antenna sweep frequency. Timing reference 4 is used as the control input to the synchronous sine demodulator 81. The synchronous sine demodulator 81 provides an output which is equal to its input when its control input is logically true and equal to the inversion of its input when its control input is logically false. The signal, which is shown as the waveform 85, has an average value equal to the magnitude of the audio output 3, times the sine of the angle between the audio output 3 and the timing reference 4. Low pass filter 87 removes the ripple frequencies (at multiples of the sweep frequency) from the sine demodulator output 85 and provides a DC signal to the A to D converter 89 which is equal to the desired average value. Similarly, the synchronous cosine demodulator 82 has as its control input a phase shifted timing reference 84. This phase shifting is accomplished by 90 degree phase shifter 83. Since the synchronous cosine demodulator reference 84 is in quadrature with the timing reference 4, the output of the synchronous cosine demodulator 82 has an average value equal to the magnitude of the audio output 3, times the cosine of the angle between the audio output 3 and the timing reference 4. Low pass filter 88 removes the high frequencies from the cosine demodulator output 86 and provides a DC signal to the A to D converter 90 which is equal to the desired average value. The microprocessor 23 divides the sine signal by the cosine signal, and takes the arctangent of this ratio. This results in the bearing angle which it then converts into a form needed to drive the angle display 27.

Figure 3:
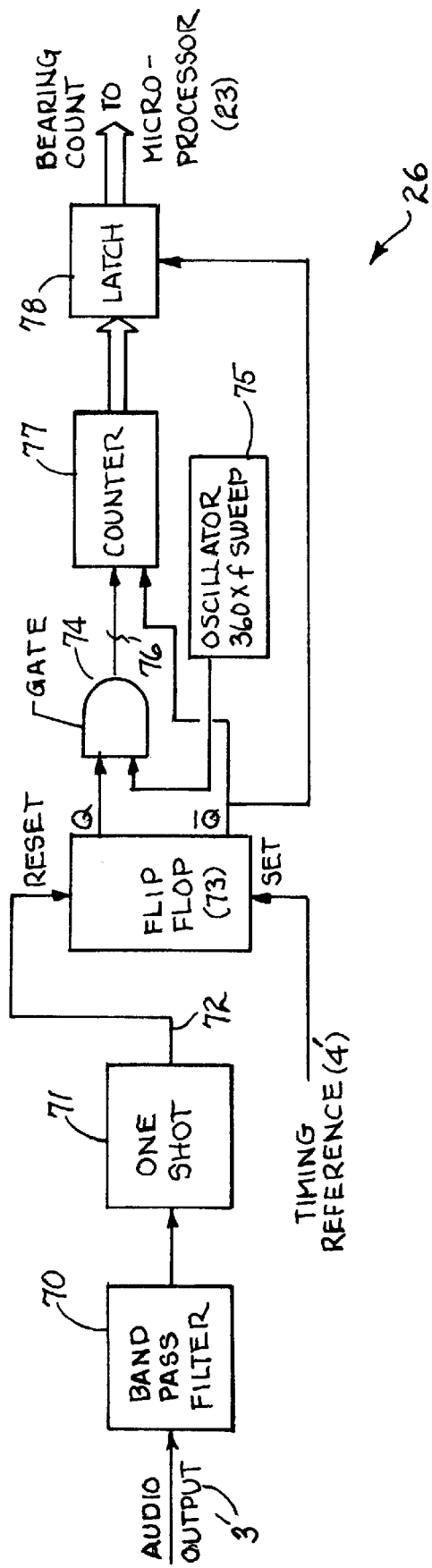
FIG. 3 is a simplified block diagram of the counter implementation of the audio phase detector, and the timing sequence of its use.
Figure 3:
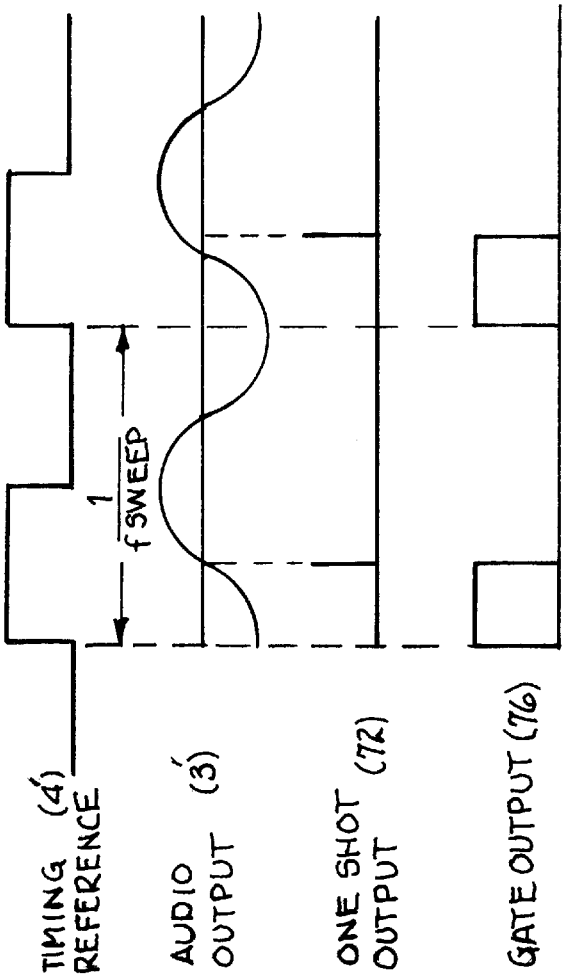

Referring to FIG. 3, wherein like numerals and symbols as previously shown in FIG. 4 have a prime ' mark added herein, an alternate embodiment of the audio phase detector 26 is shown. This embodiment implements a counter embodiment for the audio phase detector 26. The band pass filter 70 is set to pass the audio component at the antenna sweep frequency. The one shot 71 is triggered by a positive going zero crossing of the filtered audio signal. Timing reference 4' is a square wave at the antenna sweep frequency and is used to set flip flop 73. Flip Flop 73 is reset by the one shot output 72. The flip flop 73 output is used as one of the inputs to AND gate 74. The second input to the AND gate 74 is a square wave signal having a frequency equal to 360 times the sweep frequency provided by oscillator 75. The gate output 76 of the AND gate 74 is therefor a series of P pulses where P is equal to the bearing angle in degrees. The P pulses are accumulated in counter 77 and its output is transferred into latch 78 by the positive going transition of the inverted output of the flip flop 73. The same inverted output of the flip flop 73 resets counter 77. The output of the latch is read by the microprocessor 23 which converts the count P into the form needed to drive the angle display 27.

Referring to FIG. 1, the FSK decoder 28 is coupled to the audio output 3 from the FM receiver 50 and decodes the identification code modulated on the broadcast transmission locator signal. The FSK decoder 28 is selected to match the modulation format used by the broadcast transmission locator signal. In a preferred embodiment, the signal modulation is 1200 baud Minimum Shift Keyed (MSK) in which case the mark(1)/space(0) frequencies are 1200 and 1800 Hz, respectively, and the FSK decoder 28 utilizes a MX469 integrated circuit, made by MX-COM or an equivalent circuit as is well known to those skilled in the art.

In an alternative embodiment, the signal modulation format is Bell 202 and the data is sent at 1200 baud with mark(1)/space(0) frequencies of 1200 and 2200 Hz, respectively. In this alternative embodiment the FSK decoder is the MX614 integrated circuit manufactured by MX-COM, Inc. of Winston-Salem, N.C.

It should be noted, as is well known to those skilled in the art, that for RF telemetry, MSK is preferred over the Bell 202 type of modulation.

The microprocessor 23 is coupled to the FSK decoder 28 and the audio phase detector 26. The microprocessor 23 functions to convert or process the demodulator data, and to convert the identification code data and bearing angle information into the signal formats required by the identification code display 29 and the angle display 27. The microprocessor 23 is also coupled to the waveform generator 25 via the mode control 5 signal and the direction control 6 signal both of which serve to control the rotation mode and direction of the antenna 1.

The angle display 27 is coupled to the microprocessor 23 and provides the bearing angle in a format convenient for readout. In a preferred embodiment, as described herein, the angle display 27 consists of several segmented or dot matrix LED or liquid crystal displays to present the bearing in decimal form. An alternative embodiment (not shown) could however use an array of light emitting diodes (LEDs) arranged in a circle to simulate a compass rose.

The identification code display 29 provides the identification code in a convenient format for viewing. Depending on the character set used for the identification code, this display may consist of 4 to 8 decimal or hexadecimal numbers or ASCII characters. In a preferred embodiment, as described herein, the identification code display 29 consists of an LED display such as the HCMS-29XX manufactured by Hewlett Packard Co.

The operational sequencing of the direction finding electronics 20 is as shown in FIG. 2 lines 62 and 64. Under normal conditions, the direction finding electronics 20 are in the FSK decode mode as shown in FIG. 2 line 64. In this mode, the waveform generator 25 provides signals to the RF summing circuit 24 which correspond to one or more antenna elements 1a–d on but with no simulated antenna 1 rotation (FIG. 2 line 62) Preferably, all antenna elements 1a–d are commanded to the on condition which has been found to result in a net gain of several dB over the gain when the antenna elements 1a–d are simulating rotation. In this mode, the FSK decoder 28 is presented with an audio signal input, from the audio output 3 of the FM receiver 50, which is free of any modulation error due to the antenna 1 rotation. While in this mode, the system 10 will be looking for a locator transmission signal (FIG. 2, line 62, TA), and once such a signal is detected, the system 10 will detect and decode the desired identification code or information (FIG. 2, line 62, TB.)

The direction finding electronics 20 remains in this mode of non-rotation until a suitable signal has been decoded by the FSK demodulator (not shown) of the FSK decoder 28. At this time, the waveform generator 25 is caused to switch to its bearing measurement mode by the mode control 5 signal from the microprocessor 23, and the control waveforms to the RF summing circuit 24 are such as to create the variable gains needed to simulate rotation of the antenna 1 (FIG. 2, line 62, TC). Although the invention is applicable to a hard switched system to simulate antenna rotation, the RF summing circuit 24 preferably uses a continuous electronic switching and mixing of the signal from the antenna elements 1a–d. The microprocessor 23 sends a direction control 6 signal to the waveform generator 25 to select a simulated antenna 1 rotation in the clockwise direction.

The unmodulated carrier wave input to the audio phase detector 26 is a signal that contains only the frequency corresponding to the simulated rotation of the antenna 1 and is free of FSK modulation and the errors that would result from the presence of FSK modulation on the carrier wave. Following a period of clockwise simulated rotation of the antenna 1, the microprocessor 23 sends a direction control 6 signal to the waveform generator 25 to select a simulated antenna 1 rotation in the counter-clockwise direction. The waveform generator 25 remains in the bearing measurement mode for a time period which is slightly shorter than the nominal unmodulated carrier interval. It then returns to the FSK decode mode (FIG. 2, line 62, TD).

The use of alternating clockwise (CW) counterclockwise (CCW) simulated antenna 1 rotation, which is not normally possible with pulsed transmissions, may be used in this system to reduce the bearing error caused by receiver mistuning. An example of this type of antenna control and bearing measurement is described by Cooney in U.S. Pat. No. 4,148,034. If the continuous portion of the carrier wave broadcast is relatively long (for example, 1 second), the waveform generator 25 may be controlled by the microprocessor 23, via the direction control 6, to cause clockwise rotation for ½ second followed by counterclockwise rotation for another ½ second. If however, the unmodulated time interval is short (for example, 75 milliseconds), the waveform generator 25 may be controlled by the microprocessor 23, via the direction control 6, to produce a clockwise rotation for 75 milliseconds during the first received pulse and 75 milliseconds during the second received pulse. Following both clockwise and counter-clockwise simulated rotation periods of the antenna 1, and if the same identification code has been received for both simulated rotation periods, the bearing measurements are averaged together to obtain a best bearing number.

Switching between FSK decode and bearing measurement modes is based on a decision that a suitable signal is being received. This decision may be based on one or more of the following criteria:

Presence of an RF carrier exceeding a specified threshold.
Presence of audio energy within the FSK signaling bandwidth exceeding a specified threshold.
Ratio of audio energy within the FSK signaling bandwidth to audio energy outside this band exceeding a specified threshold.
Detection of an end-of-identification code signal or marker.
Decoding of identification code matching the general format (preamble bits, number of characters, etc.) for the class of transmitters which are to be tracked.
Decoding of a specific identification code matching the particular transmitter that is to be tracked.

In a preferred embodiment, the broadcast transmitter 40 will provide a predetermined time interval of unmodulated carrier following the broadcast of the FSK modulated carrier wave, this interval may be adjusted over a wide range to meet specific operational requirements. The FSK interval is typically in the range of 100 to 200 milliseconds, and the unmodulated carrier is typically between 75 milliseconds and 1 second in duration. The present invention is capable of meeting these and other specifications as are well known to those skilled in the art.

Although the invention has been particularly shown and described with reference to a preferred embodiment thereof, it will be understood by those skilled in the art that changes in form and detail may be made therein without departing from the spirit and scope of the invention.

What is claimed is:

1. An improved radio direction finder, comprising, in combination:

antenna means for receiving a locator transmission signal having alternating periods of a broadcast RF carrier wave and a broadcast FSK code modulated RF carrier wave;

radio direction finder (RDF) means coupled to the antenna means for determining the direction to a broadcasting transmitter and for extracting FSK coded information coded into the locator transmission signal by the broadcasting transmitter; and wherein the RDF means comprises antenna virtual rotation control means coupled to the antenna means for controlling the antenna in both a non-rotational mode for detection of the broadcast FSK code modulated RF carrier wave and a virtual rotation mode for detection of the broadcast RF carrier wave.

2. The system of claim 1 wherein the locator transmission signal comprises a carrier wave, an identification code, and an end-of-code signal.

3. The system of claim 1 wherein the antenna means comprises a plurality of antenna elements.

4. The system of claim 2 wherein the antenna means comprises a plurality of antenna elements.

5. The system of claim 3 wherein the plurality of antenna elements comprises at least 3.

6. The system of claim 4 wherein the plurality of antenna elements comprises at least 3.

7. The system of claim 1 wherein the RDF means further comprises:
   receiving circuitry means coupled to the antenna means for receiving the locator transmission signal; and
   decoding circuitry means coupled to the antenna means for decoding the FSK coded information.

8. The system of claim 2 wherein the RDF means further comprises:
   receiving circuitry means coupled to the antenna means for receiving the locator transmission signal; and
   decoding circuitry means coupled to the antenna means for decoding the identification code.

9. The system of claim 7 further comprising a display coupled to the decoding circuitry means for showing the FSK coded information thereon.

10. The system of claim 8 further comprising a display coupled to the decoding circuitry means for showing the identification code thereon.

11. The system of claim 1 wherein the RDF means further comprises microprocessor means coupled to the antenna means for calculating a bearing angle to the broadcasting transmitter.

12. The system of claim 2 wherein the RDF means further comprises microprocessor means coupled to the antenna means for calculating a bearing angle to the broadcasting transmitter.

13. The system of claim 11 further comprising a display coupled to the microprocessor means having the bearing angle thereon.

14. The system of claim 12 further comprising a display coupled to the microprocessor means having the bearing angle thereon.

15. The system of claim 11 wherein the microprocessor means further comprises the antenna virtual rotation control means for selecting from among the non-rotational mode for detection of the broadcast FSK code modulated RF carrier wave and the virtual rotation mode for detection of the broadcast RF carrier wave.

16. The system of claim 12 wherein the microprocessor means further comprises the antenna virtual rotation control means for selecting from among the non-rotational mode for detection of the broadcast FSK code modulated RF carrier wave and the virtual rotation mode for detection of the broadcast RF carrier wave.

17. The system of claim 15 further comprising summing means coupled to the plurality of antenna elements for continuous switching of the plurality of antenna elements and for mixing of the locator transmission signal received by the plurality of antenna elements.

18. The system of claim 16 further comprising summing means coupled to the plurality of antenna elements for continuous switching of the plurality of antenna elements and for mixing of the locator transmission signal received by the plurality of antenna elements.

19. A method for receiving and decoding a locator transmission signal, comprising, the steps of:
   providing an antenna for receiving the locator transmission signal wherein the locator transmission signal comprises:
   a period of a broadcast RF carrier wave; and
   a period of a broadcast FSK code modulated RF carrier wave, wherein the FSK modulation is performed by a broadcasting transmitter;
   holding the antenna stationary for enhanced extraction of FSK code embedded information from the broadcast FSK code modulated RF carrier wave; and
   virtually rotating the antenna during the period of the broadcast RF carrier wave for determining the bearing angle to the source of the broadcast RF carrier wave.

20. The method of claim 19 wherein the step of providing an antenna further comprises the step of providing an antenna having at least 3 antenna elements.

21. The method of claim 20 further comprising the steps of:
   summing a signal from each of the at least three antenna elements during the period of non-rotation of the antenna to provide a summed signal from which to extract the FSK code embedded information; and
   continuously switching and mixing a signal from each of the at least 3 antenna elements to virtually rotate the antenna wherein the virtual rotation of the antenna is used for determining the bearing angle to the source of the broadcast RF carrier wave.

* * * * *